US010443153B2

(12) United States Patent
Niemz et al.

(10) Patent No.: US 10,443,153 B2
(45) Date of Patent: Oct. 15, 2019

(54) FLAME-RESISTANT MOLDED CELLULOSE BODIES PRODUCED ACCORDING TO A DIRECT DISSOLVING METHOD

(71) Applicant: smartpolymer GmbH, Rudolstadt (DE)

(72) Inventors: Frank-Günter Niemz, Rudolstadt (DE); Marcus Krieg, Weimar (DE); Michael Mooz, Saalfelder Höhe (DE); Ralf-Uwe Bauer, Rudolstadt (DE); Sabine Riede, Uhlstädt-Kirchhasel (DE)

(73) Assignee: smartpolymer GmbH, Rudolstadt (DE)

( * ) Notice: Subject to any disclaimer, the term of this patent is extended or adjusted under 35 U.S.C. 154(b) by 0 days.

(21) Appl. No.: 15/124,872

(22) PCT Filed: Mar. 5, 2015

(86) PCT No.: PCT/EP2015/054649
§ 371 (c)(1),
(2) Date: Sep. 9, 2016

(87) PCT Pub. No.: WO2015/135835
PCT Pub. Date: Sep. 17, 2015

(65) Prior Publication Data
US 2017/0016148 A1    Jan. 19, 2017

(30) Foreign Application Priority Data
Mar. 11, 2014    (DE) .................... 10 2014 003 455

(51) Int. Cl.
*D01F 1/07*       (2006.01)
*C08K 5/3492*     (2006.01)
*D01F 2/00*       (2006.01)
*D01F 2/02*       (2006.01)
*C08L 1/02*       (2006.01)
*C08L 61/28*      (2006.01)
*D01D 5/06*       (2006.01)
*D01F 11/02*      (2006.01)

(52) U.S. Cl.
CPC ............ *D01F 1/07* (2013.01); *C08K 5/34922* (2013.01); *C08L 1/02* (2013.01); *C08L 61/28* (2013.01); *D01D 5/06* (2013.01); *D01F 2/00* (2013.01); *D01F 2/02* (2013.01); *D01F 11/02* (2013.01); *C08L 2201/02* (2013.01); *C08L 2203/12* (2013.01); *C08L 2205/22* (2013.01); *D10B 2501/00* (2013.01)

(58) Field of Classification Search
CPC ... C08L 2205/22; C08L 1/00; C08K 5/34922; C08K 5/34924
See application file for complete search history.

(56) References Cited

U.S. PATENT DOCUMENTS

| | | | |
|---|---|---|---|
| 4,026,810 A * | 5/1977 | Bost ...................... | C08G 79/04 106/18.14 |
| 4,220,742 A | 9/1980 | Mietzsch | |
| 4,279,652 A | 7/1981 | Ciaperoni | |
| 4,440,880 A * | 4/1984 | Albanesi ............... | C01B 25/006 523/200 |
| 4,698,215 A * | 10/1987 | Albanesi ............... | C01B 25/006 252/400.1 |
| 5,110,850 A * | 5/1992 | Farkas ............... | C08K 5/34922 524/100 |
| 5,700,575 A * | 12/1997 | Iwata ........................ | C08K 3/22 428/403 |
| 6,673,855 B1 * | 1/2004 | Braga .................. | C08K 3/0008 524/445 |
| 7,169,836 B2 * | 1/2007 | Harashina ............ | C08K 5/5399 524/116 |
| 7,175,792 B1 * | 2/2007 | Bauer ...................... | D01F 2/00 162/182 |
| 2002/0115812 A1 * | 8/2002 | Avar ...................... | C08J 9/0038 528/44 |

(Continued)

FOREIGN PATENT DOCUMENTS

| | | | |
|---|---|---|---|
| AT | 511 509 | A1 | 12/2012 |
| DE | 43 06 808 | A1 | 9/1994 |
| DE | 100 38 100 | A1 | 2/2002 |
| DE | 20 2010 017 680 | U1 | 6/2012 |
| WO | WO 93/12173 | A2 | 6/1993 |
| WO | WO 1994/026962 | A1 | 11/1994 |
| WO | WO 2003/040460 | A1 | 5/2003 |
| WO | WO 2011/026159 | A1 | 3/2011 |
| WO | WO 2011/045673 | A1 | 4/2011 |
| WO | WO 2013/148652 | A1 | 10/2013 |

OTHER PUBLICATIONS

Liu et al. (Journal of Applied Polymer Science, vol. 102, 1773-1779 (2006)).*

(Continued)

*Primary Examiner* — Liam J Heincer
(74) *Attorney, Agent, or Firm* — ProPat, L.L.C.; Vinisha Joshi; Cathy Moore

(57) ABSTRACT

The invention relates to molded cellulose bodies, in particular fibers, filaments, directly spun nonwovens, films, or foams which have flame-resistant properties. The fibers and filaments can be further processed as textiles into yarns, wovens, knitted fabrics, and nonwovens. The molded bodies are produced from solutions of cellulose and melamine cyanurate or cellulose and crosslinked or partially crosslinked melamine resin particles in an organic solvent. The melamine cyanurate or the melamine resin particles provide the molded cellulose bodies with flame-retardant properties. The molded cellulose bodies made of cellulose and melamine cyanurate or melamine resin particles can further contain flame retardants, in particular flame retardants which act synergistically, in a particulate form. The obtained textile fibers and nonwoven materials have a soft touch and can be processed or finished as filaments or yarns on conventional textile machines.

16 Claims, No Drawings

(56) References Cited

U.S. PATENT DOCUMENTS

| | | | |
|---|---|---|---|
| 2003/0159620 A1* | 8/2003 | Kosan | D01F 2/00 106/200.2 |
| 2003/0203199 A1 | 10/2003 | Song et al. | |
| 2007/0224419 A1* | 9/2007 | Sumnicht | D21C 9/005 428/364 |
| 2007/0278463 A1* | 12/2007 | Ratzsch | B27N 9/00 252/607 |
| 2009/0215926 A1* | 8/2009 | Kozlowski | C08K 5/5205 523/179 |
| 2009/0309256 A1* | 12/2009 | Kolbe | D01F 1/10 264/171.1 |
| 2009/0326108 A1* | 12/2009 | Kim | C08K 3/34 524/101 |
| 2010/0324183 A1* | 12/2010 | Henze | C08K 5/0066 524/101 |
| 2011/0045078 A1* | 2/2011 | Kolbe | C08L 1/02 424/488 |
| 2011/0117353 A1* | 5/2011 | Henshaw | D02G 3/443 428/221 |
| 2012/0156486 A1* | 6/2012 | Bisjak | D01F 1/07 428/375 |
| 2012/0183695 A1 | 7/2012 | Piana et al. | |
| 2012/0215148 A1* | 8/2012 | Ewert | D01D 5/14 602/45 |
| 2013/0041080 A1* | 2/2013 | Kamiya | C08L 23/0869 524/133 |
| 2013/0210970 A1* | 8/2013 | Kwant | B01J 2/16 524/100 |
| 2013/0337715 A1* | 12/2013 | Ruf | D01F 1/07 442/414 |
| 2014/0163171 A1* | 6/2014 | Cernohous | C09K 21/14 525/164 |
| 2014/0200292 A1* | 7/2014 | Okita | C08K 3/34 524/101 |
| 2015/0203692 A1* | 7/2015 | Lai | C08F 230/02 428/522 |
| 2015/0275050 A1* | 10/2015 | Wei-Cheng | C09K 21/12 428/354 |
| 2016/0075849 A1* | 3/2016 | Kaul | C08K 5/521 524/430 |
| 2016/0208430 A1* | 7/2016 | Duffy | D06M 11/83 |

OTHER PUBLICATIONS

Berghof, K. et al. "Thermo-resistant lyocell fibers," Chemical Fibers International, IBP Press, Frankfurt Am Main, Germany, vol. 54, No. 1, Feb. 2004, pp. 34-36.

Meister, F. et al. "Alceru Thermosorb—Innovative, Active Thermoregulating Cellulose Fiber," Chemical Fibers International, IBP Press, Frankfurt Am Main, Germany, vol. 55, No. 6, Dec. 2005, pp. 355-356.

* cited by examiner

FLAME-RESISTANT MOLDED CELLULOSE BODIES PRODUCED ACCORDING TO A DIRECT DISSOLVING METHOD

CROSS-REFERENCE TO RELATED APPLICATIONS

This application is being filed under 35 U.S.C. § 371 as a National Stage Application of pending International Application No. PCT/EP2015/054649 filed Mar. 5, 2015, which claims priority to the following parent application: German Patent Application No. 10 2014 003 455.0, filed Mar. 11, 2014. Both International Application No. PCT/EP2015/054649 and German Patent Application No. 10 2014 003 455.0 are hereby incorporated by reference herein in their entirety.

FIELD OF THE INVENTION

The invention relates to permanently treated shaped cellulose articles which possess inherent flame-retardancy or low-flammability properties. The shaped cellulose articles can be produced by a lyocell method.

BACKGROUND OF THE INVENTION

Cellulosic fibers obtained from a solution of directly dissolved cellulose have been classified by the International Bureau for Standardization in Brussels (BISFA) as lyocell fibers. In that case the dissolving of the cellulose and the processing of the cellulose spinning solution take place without chemical derivatization of the cellulose. The fibers can be utilized in one case as staple fibers with subsequent spinning into yarns, or can be utilized directly as continuous filaments in an operation for producing sheetlike textile structures by weaving, knitting, webforming, etc.

The term "shaped lyocell articles" used hereinafter encompasses fibers, filaments, nonwovens, films, and foams based on lyocell cellulose.

The term "flame retardant" refers to an agent which delays, or under normal conditions prevents, the burning of a product to which it has been applied or into which it has been Incorporated. This quality is referred to below as "low flammability".

In order to assess the combustibility of samples, an index used in practice, besides the assessment of burning in a fire chamber, is the Limiting Oxygen Index (LOI), this being the minimum oxygen concentration in % at which a material still just burns.

Commercially available lyocell fibers of low flammability are very largely characterized by retrospective treatment of the fibers with coatings containing diverse substances, which are of limited durability and effect. Especially when the textiles are required to undergo wet treatments (laundering with different detergents, especially at elevated temperatures) and/or as a result of migration of the chemicals from the treated fibers, these retrospectively applied coatings come up against their limits. Furthermore, these coatings adversely impact the tactile qualities and water vapor transport capacity of the cellulosic fibers.

Within the field of endowing cellulosic fibers, produced by the viscose process, with flame retardancy, a solution is provided in U.S. Pat. No. 4,220,472, by means of a specific, phosphorus-containing flame retardant (dithiophosphoric anhydride), which is incorporated during fiber production. This solution, as well as other attempted solutions, do not produce a satisfactory outcome in the case of the lyocell process, particularly the industrial NMMO process implemented in the art, since the flame retardant does not withstand the operation of producing the lyocell fibers.

WO 2003040460 and DE 10038100 disclose various methods for imparting flame retardancy to cellulosic fibers, the finished fiber being subjected to treatment with cyanuric chlorine derivatives. A costly and inconvenient treatment procedure, associated with energy-related and environmental disadvantages; the presence of chlorine, which is critical in the event of fire, in the flame retardant; and a relatively low level of flame retardancy (LOI not more than 25) are disadvantages of such a procedure.

The redispersible dispersion-based powders of various copolymers, described in DE 4306808, are also applied to a cellulosic fiber which has already been completed, this method being more suited to fiber composites than to filaments or fibers which can be processed as textiles.

A feature common to all of these cited patents and the solutions they present is that only coating of the fiber surface with the flame retardant is realized. This coating is usually thin, and so does not result in a substantial and (wash-) permanent flame retardancy.

WO 1994026962 claims the impregnation of a freshly spun lyocell fiber, after washing and before drying, with a phosphorus-based flame retardant, followed by a fixing process. The treatment must be regarded as costly and inconvenient, and there will be a deterioration in textile qualities, such as the hand, of such fibers. Moreover, the compounds presented are not wash-resistant.

WO2011045673 describes flame-retardant lyocell fibers with incorporated inorganic flame retardants, such as kaolin or talc. These flame retardants are active only in very high proportions, and have deleterious effects on the physical textile qualities of the fibers. Consequently these fibers can be employed only in mattresses and upholstered furniture.

Other established phosphorus-containing flame retardants used in the production of viscose fibers, such as EXOLIT® (SANDOFLAM®), in WO2011026159, for example, do not withstand the thermal stress of the preparation of solution in a lyocell process, and are consequently not a suitable flame retardant system for lyocell processes.

Up to the present there has been no disclosure of a satisfactory solution which describes the production of shaped, low-flammability lyocell articles in a continuous production operation without substantial complication of the operation of the lyocell process, and which affords fibers, filaments, and nonwovens having sufficiently textile character. A great advantage here, relative to the viscose process, for example, is that in the lyocell process even a high fraction of additives in the fiber guarantee good mechanical properties, as are necessary for processing of the fibers on standard machinery in spinning, weaving, and finishing and also in the use of the sheetlike textiles.

SUMMARY OF ADVANTAGEOUS EMBODIMENTS OF THE INVENTION

It is an object of the invention, therefore, to find flame retardancy systems which give rise, without substantial alteration of or extension to the lyocell process, to a low-flammability, shaped, textile cellulose article which can be processed as a textile, the flame retardancy being intended to remain permanently and inherently during the utilization, the use, and the care of the products produced from these shaped articles.

A further object is to provide shaped cellulosic articles such as fibers, filaments, direct spunbondeds, films or foams which are characterized by possessing low-flammability properties and being able to be further processed as textiles to form yarns, woven fabrics, knitted fabrics, and nonwoven webs. In this context, there should be no deterioration in the advantageous properties of shaped cellulose articles, such as breathability and moisture uptake, and textile processing to fabrics which can be worn directly on the skin should continue to be ensured.

Surprisingly it has been found that the object can be achieved by a blend of cellulose and melamine cyanurate or of cellulose and wholly or partly crosslinked melamine resin particles.

DETAILED DESCRIPTION OF ADVANTAGEOUS EMBODIMENTS OF THE INVENTION

The invention accordingly provides a shaped lyocell article having a lyocell cellulose matrix and being of low flammability by virtue of the presence therein of melamine cyanurate or of partly or wholly crosslinked melamine resin and being characterized in that the melamine cyanurate or the melamine resin is distributed in the form of particles over the cross section of the cellulose matrix.

The invention additionally provides a method for producing the shaped, low-flammability lyocell cellulose article, with the following steps:
a) production of a suspension of cellulose in a hydrous or anhydrous organic solvent,
b) conversion of the suspension into a cellulose solution by shearing, optionally in conjunction with evaporative removal of water,
c) forming of the solution by extrusion or blow molding by means of a shaping tool, d) introduction of the shaped article into a precipitation bath,
e) washing and optionally aftertreating, and
f) drying of the shaped article,
which is characterized in that, in order to impart the flame retardancy properties, melamine cyanurate or melamine resin, in each case alone or in conjunction with other flame retardants, is admixed in step a) or in or at the end of step b).

It is immaterial here whether the solvent utilized is an aqueous tertiary amine oxide, such as N-methylmorpholine N-oxide (NMMO), for example, or an ionic liquid, such as butylmethylimidazolium chloride (BMIMCl), ethylmethylimidazolium acetate (EMIMAc) or ethylmethylimidazolium diethylphosphate (EMIM DEP), for example.

Melamine cyanurate (MC) as nitrogen-containing flame retardant constitutes a good alternative to halogenated flame retardants. In the event of fire and/or high temperatures, it dilutes the gas phase and has an endothermic effect, similarly to a halogenated flame retardant.

Initial studies showed that melamine cyanurate (i.e., 1:1 complex of cyanuric acid and melamine; CAS registry number 37640-57-6) does not dissolve in the solvents stated. Surprisingly, however, it was found that in the presence of cellulose and under shearing conditions, homogeneous spinning solutions can be obtained, with NMMO and/or NMMO monohydrate as solvent, for example. In the case of 9:3:82% cellulose:melamine cyanurate:solvent compositions, for example, the resulting spinning solutions are particle-free and clear. Relative to a pure cellulose solution with the same concentration, this solution of cellulose and melamine cyanurate has a refractive index which is higher by 0.04 to 0.06 units.

Fibers produced from these solutions represent a blend. The coagulation of the fibers, their washing, preparation, and drying take place without "bleeding" of 3 phase. Melamine cyanurate and cellulose form a unitary network. Other particulate flame retardants that may possibly be added are embedded firmly and stably into this network of two substances. Additionally introduced synergistic flame retardants of this kind are particulate, and the water solubility is less than 10 mg/l (25° C. water). In the context of production of textile fibers, the particles ought to be in the range of less than 50 μm, preferably less than 10 μm. Examples of flame retardants interacting synergistically with the melamine cyanurate or with the melamine resin include aluminum hydroxide, red phosphorus, organophosphorus compounds, silicatic nanoparticles, or compounds comprising boron.

It has emerged here that the production of the shaped cellulosic articles composed of the above-described blend with melamine cyanurate can be performed without substantial technological alterations or additions to the generally usual lyocell technology. The resultant shaped cellulosic articles have low-flammability properties without additional, retrospective treatment or coating. There is no substantial deterioration in the clothing physiology properties in relation to wear comfort and moisture management, and the influencing of the textile-physical parameters of the shaped cellulosic articles produced therefrom is still acceptable, ensuring further processing and requisite use properties. The profile of properties of the blend represents a durably retained superimposition of the properties of the individual components (cellulose as hydrophilic biopolymer with the known clothing physiology properties; melamine cyanurate as flame retardant). The same statements in relation to the method and to the textile-physical and clothing-physiological properties of the shaped articles also apply to the use of wholly or partly crosslinked melamine resin particles.

The solution—the production of flame-retardant cellulosic fibers from a blend, which can be produced by admixing melamine cyanurate to cellulose and dissolving the two constituents in a solvent—is novel. The effects achieved accordingly are surprising and cannot be inferred from the prior art.

Even if the melamine cyanurate is not completely dissolved, permanently flame-retardant lyocell fibers and/or filaments and spunbondeds are still obtained. These filaments and spunbondeds can still be processed as textiles. Shaped cellulose articles composed of such a mixture are another component of the present invention.

For the utilization of melamine resins as flame retardants of shaped cellulose articles in the sense of the invention, wholly or partly crosslinked particles are used, it being possible for the degree of crosslinking to be 75 to 100%. Preference is given to using melamine resin particles with complete or near-complete crosslinking, in order to rule out possible interactions and reactions with the solvent. Moreover, in terms of their particle size characteristics, the melamine resin particles employed are to be used such that the relation between their average size of 98% of all the particles ($D_{98}$) and the diameter of the resulting fibers or thickness of the films ($D_f$) satisfies the following equation:

$$\frac{(D_{98})^2}{(D_f)^2} \leq 0.25$$

Instead of or in addition to melamine cyanurate, other melamine salts are suitable in principle as well, such as melamine oxalate, melamine phosphate or melamine borate, and also melamine itself. Melamine cyanurate and melamine resins are nevertheless preferred.

The fibers or filaments can be used for sheetlike textile structures, and the direct spunbondeds produced can be used for protective apparel, for decorative purposes, for furniture coverings and seat coverings, without any relevant deterioration in the capacity of the textile processing on conventional textile machinery. They possess a soft textile hand, and they or products produced from them can be colored using normal coloring methods. Furthermore, the level of permanence of the inherent flame retardancy properties is high, through utilization, use, and care of the textiles produced from these fibers. For textile applications with flame retardancy properties, especially in the apparel segment, shaped articles which are suitable are by preference those having a fraction of melamine cyanurate of 10 to 50 wt %, preferably of 10 to 35 wt %. The cellulose fraction in this shaped article endows the products with high flexibility, a soft hand, and good water absorption properties. The cellulose fraction is preferably 50 to 90 wt %, more preferably 65 to 90 wt %.

For the various applications, depending on the profile of requirements, the fractions of flame retardant are varied, or the shaped articles obtained can be mixed with other shaped articles, in the form of blends or laminates, and then processed to give the corresponding end products.

As a result of the addition of the flame retardant during production of the spinning solution itself, the flame retardant is distributed finely over the entire cross section of the cellulose matrix in the finished shaped article, and the use properties and processing properties of the shaped article are retained.

In addition to the melamine cyanurate or melamine resin, further flame retardants or other customary constituents are optionally also present, in minor amounts, in the shaped cellulose article of the invention. The further flame retardants are preferably aluminum hydroxide, red phosphorus, organophosphorus compounds, silicatic nanoparticles, or compounds comprising boron. Their solubility in water of 25° C. is preferably less than 10 mg/l. In the shaped cellulose article they are present in particulate form, with the particle size being preferably less than 50 μm, preferably less than 10 μm. The stated further flame retardants interact synergistically with the melamine cyanurate or melamine resin.

The shaped articles here as well are generally fibers, filaments, films or foams. The melamine cyanurate fraction reduces the swellability of the resultant shaped articles. Besides textile applications, industrial applications in the sound protection, insulating or isolating segment are also envisaged. Particularly suitable for this sector are shaped articles having a fraction of melamine cyanurate or melamine resin particles of 50 to 95 wt % and a cellulose fraction of 5 to 50 wt %.

The examples below serve to illustrate the invention. Percentages are percentages by weight, unless indicated otherwise or evident from the context.

EXAMPLE 1

By mixing together and stirring, a suspension was produced from 6% of cellulose having a Cuoxam DP of 615, 6% of melamine cyanurate (BUDIT® 315 from Chemische Fabrik Budenheim KG), 52.5% of NMMO, and 35.5% of water. This suspension was brought to a solution by shearing and evaporation of water under conditions of 95° C. and 70 mbar reduced pressure, and the solution was subsequently forced through a fiber spinneret, passed through an air gap into a precipitation bath, and drawn off. This was followed by washing to remove the solvent, finishing, cutting, and drying of the fibers. The resultant fiber had a BUDIT® 315 content of 50% and a linear density of 3 dtex. From these fibers, nonwoven webs of 250 g/m² were produced. These webs were subjected to LOI (in accordance with ISO 4589) and also to a fire chamber fire test (in accordance with DIN 4102-1 Class B2, DIN 75 200, ISO 3795 DIN 75200).

Furthermore, by varying the composition, further fibers with different amounts of BUDIT®were produced, from which nonwoven webs were likewise produced and tested. An overview of the composition of the fibers, and the LOI values and fire tests determined on nonwoven webs, are given in the table below:

|  | Comparative fiber | Fiber 1a | Fiber 1b | Fiber 1c | Fiber 1d |
|---|---|---|---|---|---|
| Fiber composition Cellulose/Budit 315 | 100/0 | 83/17 | 75/25 | 67/33 | 50/50 |
| Linear fiber density, dtex | 1.9 | 2.0 | 2.0 | 2.0 | 3.0 |
| Fiber tenacity, cN/tex | 40.8 | 32.3 | 28.9 | 24.2 | 17.5 |
| Fiber elongation, % |  |  |  | 15.3 |  |
| Web grammage, g/m² | 250 | 250 | 250 | 250 | 250 |
| Fire test |  |  |  |  |  |
| Fire chamber |  |  |  |  |  |
| Burning distance, mm | 180 | 0 | 0 | 0 | 0 |
| Classification | B | SE | SE | SE | SE |
| LOI, % oxygen | 19 | 23 | 25 | 26 | 31 |

SE - self-extinguishing (specimen ignites, but does not burn through to the first measuring mark (38 mm))
B - flame travels the entire burning distance to the end of the sample (180 mm)

EXAMPLE 2

A spinning solution with a composition of 13% of cellulose and 87% of NMMO monohydrate, and also a suspension of 30% of melamine cyanurate (MELAPUR® MC 15) in aqueous solution with 83% NMMO, were produced. Thereafter the solution and the suspension were mixed intensively using a dynamic mixer in a ratio of 5.4 parts of cellulose solution to 1 part of melamine cyanurate suspension. Furthermore, the resulting solution was spun to give fibers, and nonwoven webs were produced as set out in Example 1. The resultant 250 g/m² web was self-extinguishing, and the flame went out without traveling the burning distance; the LOI measured was 27%. The fiber processed in the web had a melamine cyanurate fraction of 33% with a linear density of 1.9 dtex.

EXAMPLE 3

The procedure of Example 2 was repeated, but the suspension admixed to the solution was composed of 25% of melamine cyanurate (BUDIT ® 315), 5% of aluminum hydroxide (APYRAL® 40CD) in aqueous solution with 83% of NMMO. The spun fiber had a 27% melamine cyanurate content and 5.5% aluminum hydroxide content. The 250 g/m² web obtained from these fibers was self-extinguishing, and the flame went out without traveling the burning distance; the LOI measured was 26%.

EXAMPLE 4

The procedure of Example 1 was repeated, but as well as cellulose, melamine cyanurate, and aqueous NMMO, a separately prepared dispersion of phyllosilicate (NANO-FIL® 116), dispersed in water and stabilized with a dispersing system, was additionally added. Moreover, the solution and the fibers were produced as in Example 1. The resulting fibers, Linear density of 2 dtex, had a composition of 75% of cellulose, 20% of melamine cyanurate, and 5% of phyllosilicate. Fire tests on a knitted fabric of 300 g/m², produced from 100% fiber yarns of this fiber with a cut length of 38 mm, produced the following assessment:
LOI: 29%

Burning test in the fire chamber: self-extinguishing without a flame traveling the burning distance.

After 50 industrial washes, the tests concluded with virtually identical results (LOI: 28, burning test self-extinguishing).

EXAMPLE 5

By mixing together and stirring, a suspension was produced from cellulose having a DP of 615, melamine cyanurate (BUDIT® 315), and 60% aqueous NMMO. This suspension was converted by shearing and evaporation of water, at a temperature of 95° C. and under a pressure of 70 mbar, into a solution whose composition was as follows: 2.9% of cellulose, 26.5% of melamine cyanurate, 70.6% of NMMO monohydrate.

The resulting solution had a zero-shear viscosity of 620 Pa·s (85° C.) and was converted by a modified meltblown process into a spunbonded web which, after washing to remove the NMMO and drying, consisted of 91% of melamine cyanurate and 9% of cellulose. According to the setting of the conditions of the spinning pump, the quantity and temperature of blowing air, and the belt speed of web transport, spunbonded webs of 15 to 400 g/m² with linear fiber densities of 1 to 10 μm were obtained.

EXAMPLE 6

By joint mixing of 64 g of air-dry cellulose having a DP of 620, 775 g of aqueous NMMO (60%), and 21 g of finely ground, etherified melamine resin ($D_{98}$ 5 μm), and evaporation of 238 g of water by application of a reduced pressure of 60 mbar at 95° C., a homogeneous suspension of melamine resin in a cellulose solution was obtained. This solution was spun by an air-gap spinning process, with subsequent washing and drying, to form fibers with a linear density of 2.3 dtex. Nonwoven webs produced from these fibers, in the burning test in a combustion chamber, were self-extinguishing and were characterized by an LOI of 25.

The invention claimed is:

1. A shaped lyocell article having a cellulose matrix and being of low flammability by virtue of the presence therein of melamine cyanurate or of partly or wholly crosslinked melamine resin, wherein the melamine cyanurate or the melamine resin is distributed homogeneously in the form of particles over the cross section of the cellulose matrix, the shaped article having a fraction of melamine cyanurate or melamine resin particles of 20 to 35 wt.% for textile applications with flame retardancy properties.

2. The shaped article of claim 1, wherein said article is a fiber, filament, non-woven, film or foam.

3. The shaped article of claim 1, wherein the shaped article is a fiber having a diameter or film having a thickness and the melamine resin particles possess a degree of cross-linking of 75 to 100% and a relation between an average size of 98% of the melamine resin particles ($D_{98}$) and the diameter of the resulting fibers or thickness of the resulting films ($D_f$) satisfies the following equation:

$$\frac{(D_{98})^2}{(D_f)^2} \leq 0.25.$$

4. The shaped article of claim 1, wherein said article comprises at least one further flame retardant, the solubility of the further flame retardant in water of 25° C. being less than 10 mg/l and the further flame retardant is in particulate form, the particles being smaller than 50 μm.

5. The shaped article of claim 4, wherein said further flame retardant is synergistic and selected from aluminum hydroxide, red phosphorus, an organophosphorus compound, silicatic nanoparticles or a compound comprising boron.

6. The shaped article of claim 4, wherein the further flame-retardant particles are smaller than 10 μm.

7. The shaped article of claim 1, wherein, in addition to melamine cyanurate, said article further comprises melamine or other melamine salts.

8. The shaped article of claim 7, wherein said melamine salts are melamine oxalate, melamine phosphate or melamine borate.

9. A method for producing a shaped, low-flammability lyocell article of claim 1, comprising:
   a) producing a suspension of cellulose in a hydrous or anhydrous organic solvent which is a direct solvent for cellulose,
   b) converting the suspension into a cellulose solution by shearing, optionally in conjunction with evaporative removal of water,
   c) forming the cellulose solution by extruding or blow molding,
   d introducing the shaped article into a precipitation bath,
   e) washing and optionally after treating, and
   f) drying of the shaped article;
   wherein in step a) or in or at the end of step b), a fraction of 20 to 35 wt. % of particles of melamine cyanurate or of wholly or partly crosslinked melamine resin are admixed.

10. The method of claim 9, wherein the organic solvent is N-methylmorpholine N-oxide monohydrate or an ionic liquid.

11. The method of claim 9, wherein said forming comprises extruding or blow molding by means of a shaping tool.

12. The method of claim 10, wherein the organic solvent is butylmethylimidazolium chloride, ethylmethylimidazolium acetate or ethylmethylimidazolium diethylphosphate.

13. Apparel comprising the shaped article of claim 1.

14. A shaped lyocell article having a cellulose matrix and being of low flammability by virtue of the presence therein of melamine cyanurate or of partly or wholly crosslinked melamine resin, wherein the melamine cyanurate or the melamine resin is distributed homogeneously in the form of particles over the cross section of the cellulose matrix, the shaped article having a fraction of melamine cyanurate or melamine resin particles of 17 to 35 wt. % for textile applications with flame retardancy properties, wherein said shaped lyocell article is self-extinguishing and does not burn through a measuring mark made at 38 mm.

15. The shaped article of claim 14, wherein said article is a fiber, a filament, a nonwoven, a film or a foam.

16. The shaped article of claim 14, wherein said article is mixed with other shaped articles in the form of blends or laminates.

* * * * *